United States Patent [19]

Hagan et al.

[11] 4,360,041

[45] Nov. 23, 1982

[54] CLEANOUT FITTING

[75] Inventors: John D. Hagan, Golden Valley; Larry Swanson, Hamel; David E. Anderson, Elk River, all of Minn.

[73] Assignee: The Cretex Companies, Inc., Minneapolis, Minn.

[21] Appl. No.: 155,213

[22] Filed: Jun. 2, 1980

[51] Int. Cl.³ ............................................. F16L 55/24
[52] U.S. Cl. ................................... 138/89; 138/96 T; 137/247.43; 4/295
[58] Field of Search ................ 138/89, 96 T; 220/256, 220/327; 4/286, 287, 295; 137/247.43

[56] References Cited

U.S. PATENT DOCUMENTS

| | | | |
|---|---|---|---|
| 1,211,210 | 1/1917 | Miller | 137/247.43 |
| 1,291,577 | 1/1919 | McIlroy | 138/96 T |
| 1,852,123 | 4/1932 | Lutsky | 4/287 |
| 1,951,645 | 3/1934 | Boosey | 4/295 X |
| 2,328,203 | 8/1943 | Duggan | 138/96 T |
| 2,329,997 | 9/1943 | Luff | 137/247.43 |
| 2,471,301 | 5/1949 | Boosey | 138/89 X |
| 2,905,951 | 9/1959 | Weddendorf | 4/287 |

Primary Examiner—James E. Bryant, III
Attorney, Agent, or Firm—Dorsey & Whitney

[57] ABSTRACT

A cleanout fitting for use in the construction industry in conjunction with a lateral sewer line to bring the sewer line up to floor level at various locations to facilitate cleaning of the same. The fitting includes a pipe section with internal threads, a plug member with external threads adapted for engagement with the internal threads of the pipe section, a cover plate positionable on top of the pipe section and a connection member for connecting the cover plate with the plug member.

17 Claims, 7 Drawing Figures

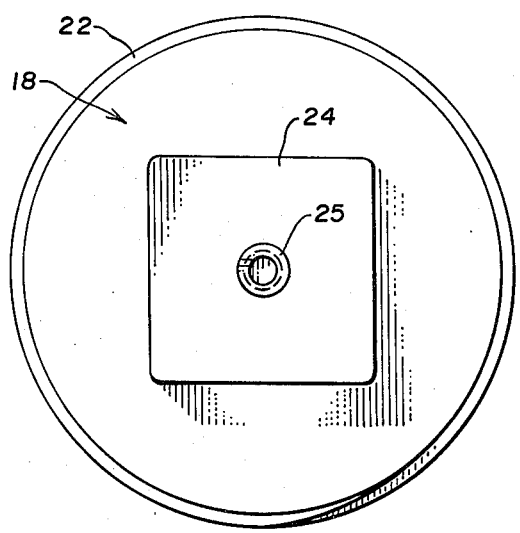
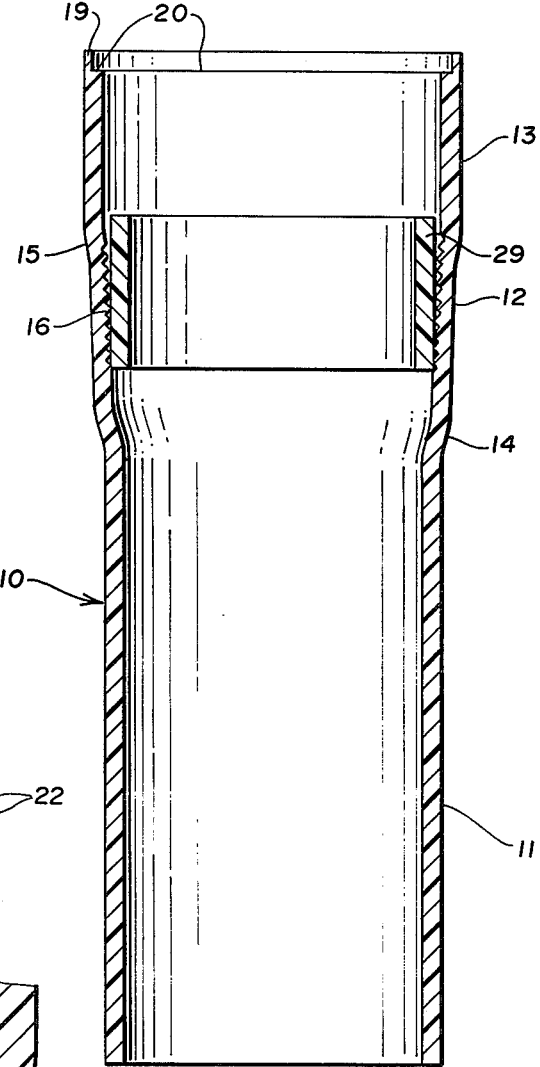
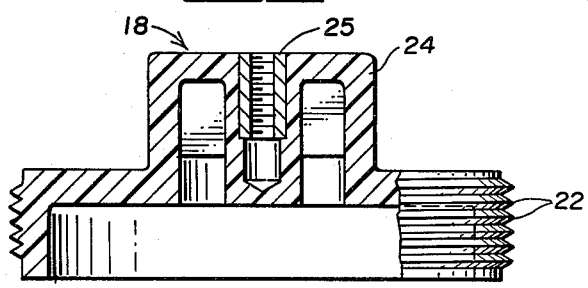
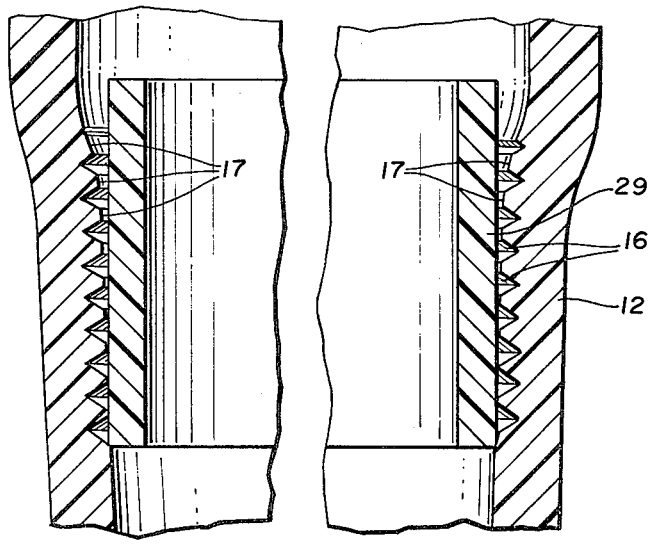

CLEANOUT FITTING

BACKGROUND OF THE INVENTION

The present invention relates generally to a cleanout fitting, and more particularly, to an improved cleanout fitting usable in the construction industry for bringing a sewer pipe or the like up to floor level.

Cleanout fittings are commonly used in the construction industry, and particularly in underground plumbing, in conjunction with a lateral sewage line and a vertical riser to bring a sewer pipe or the like up to floor level. A cleanout fitting facilitates cleaning of the sewage line after the same has been installed. A typical prior art cleanout fitting includes an elongated piece of four inch cast iron pipe with internal threads at its upper end to receive a threaded cap member. The bottom end of such pipe is adapted for connection with the vertical riser by a rubber gasket, poured lead joint, plastic coupling, neoprene in stainless steel coupling, or other similar coupling element. The top edge of the riser is normally positioned well below the intended floor level. The cleanout fitting described above also commonly includes an adjustment collar adapted for securement to the exterior surface of the upper portion of the pipe section by a plurality of setscrews. This collar includes an internal ring member and a top cover plate. The vertical level of the top of the fitting relative to the riser is first adjusted by cutting off a portion of the cast iron pipe section. Final adjustment of the above described cleanout fitting is made by adjusting the vertical position of the collar.

The prior art cleanout fitting described above has several disadvantages. First, most of the elements are constructed of cast iron, thus, the fitting is quite heavy and requires a relatively time consuming operation to cut off a portion of the cast iron pipe for an initial adjustment. Secondly, such fitting consists of several separate pieces including the pipe member, the cap, a collar, the plurality of setscrews, the ring member and the cover plate, thus increasing the chance that some will be lost, misplaced or broken during construction or use. Thirdly, the fitting described above is quite cumbersome and expensive.

SUMMARY OF THE INVENTION

The cleanout fitting of the present invention is constructed from a lightweight plastic material such as polyvinylchloride (PVC), thus it is much lighter than the cast iron fittings of the prior art and much more easily cut off and trimmed for adjustment. Further, the fitting of the present invention is constructed from a single, unitary piece of pipe section having a belled-out or enlarged portion and includes fewer functioning pieces than the cleanout fittings of the prior art.

The particular structure of the present invention includes an elongated piece of PVC pipe having an enlarged intermediate portion with internal threads commencing a distance from the top of the fitting. These internal threads are adapted for engagement by the external threads of a plug member. The upper edge of the fitting includes a flange and shoulder portion for seating a top cover plate member. The top plate is secured to the fitting by a threaded screw extending through the plate and into a raised portion of the plug member. A generally cylindrical member is also provided to protect the internal threads in the fitting when the plug portion is removed and sewer is being cleaned.

Accordingly, it is an object of the present invention to provide an improved cleanout fitting which is lightweight and easily adjusted.

Another object of the present invention is to provide an improved cleanout fitting having fewer operative pieces than the prior art.

A further object of the present invention is to provide an improved cleanout fitting with an improved means for securing the cover plate to the fitting.

Another object of the present invention is to provide a means for protecting the internal threads of the lightweight fitting when the plug member is removed for cleaning.

A further object of the present invention is to provide a single cleanout fitting adapted for connection with various underground sewer materials.

These and other objects of the present invention will become apparent with reference to the drawings, the description of the preferred embodiment and the appended claims.

DESCRIPTION OF THE DRAWINGS

FIG. 3 is a plan view of the top of the plug member.

FIG. 4 is a cross sectional view of the plug member.

FIG. 5 is a cross sectional view of a portion of the cleanout fitting of the present invention with the plug member and cover plate removed and the thread protector in position to protect the internal threads of the pipe section.

FIG. 7 is an enlarged view showing the specific construction of the internal threads of the intermediate pipe section.

DESCRIPTION OF THE PREFERRED EMBODIMENT

Figure 1:
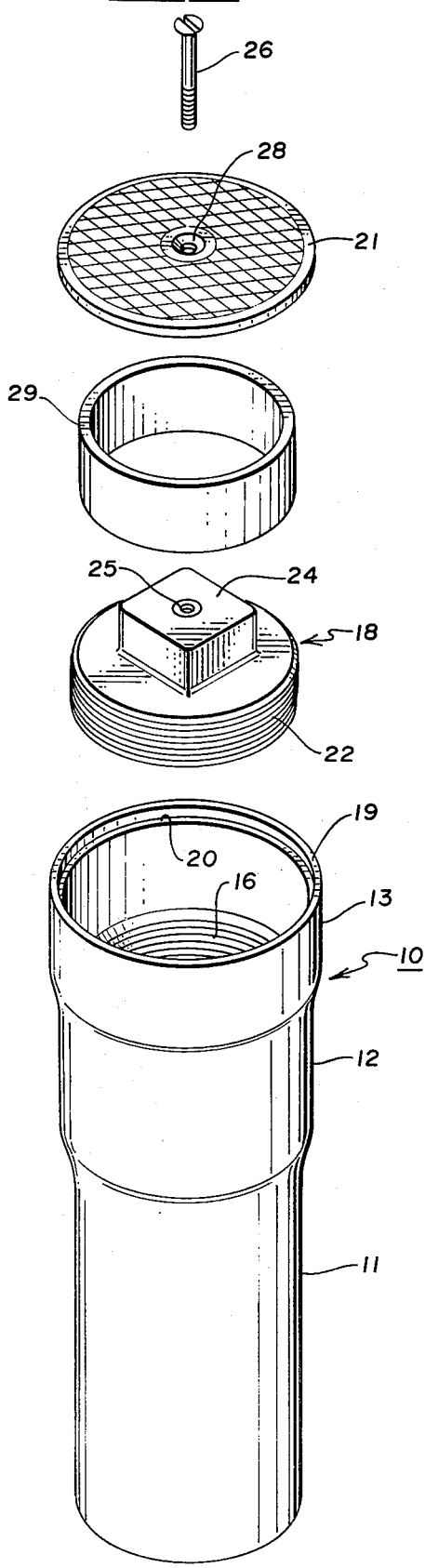
FIG. 1 is a pictorial, broken apart view of the improved cleanout fitting of the present invention.
Figure 2:
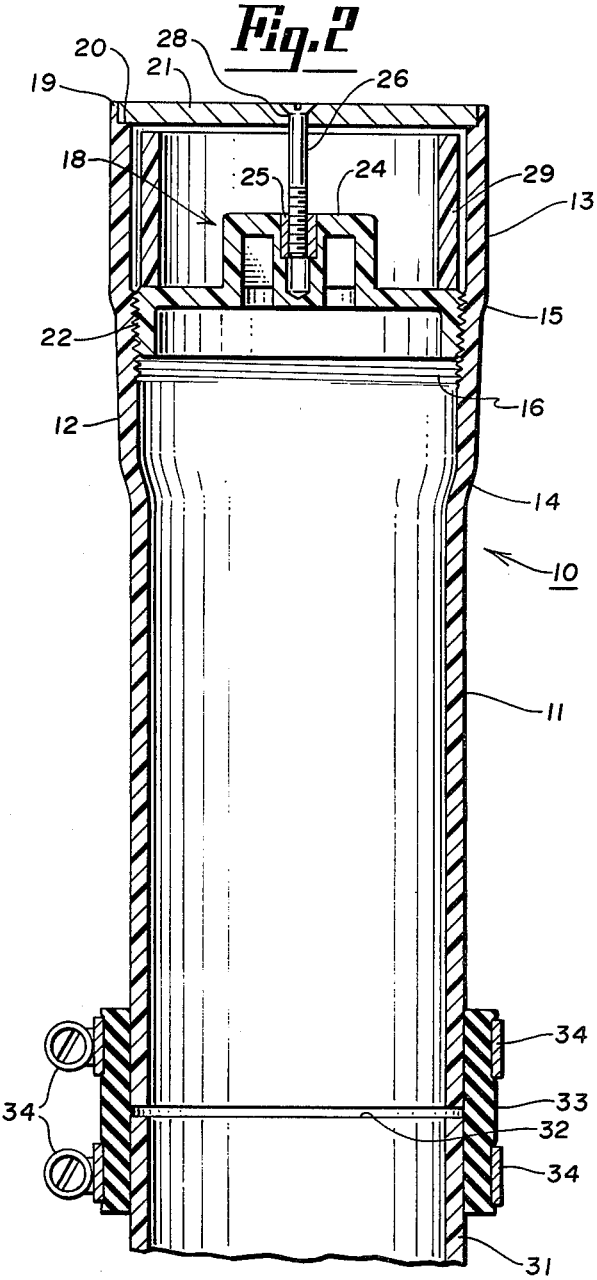
FIG. 2 is a sectional view of the improved cleanout fitting of the present invention with the plug member and cover plate shown in their normal operative positions.

Reference is first made to FIGS. 1 and 2 showing the improved cleanout fitting of the present invention. In general, the fitting includes an elongated pipe section indicated by the general reference numeral 10, a plug member 18 threadedly secured within the pipe 10, a thread protector 29, a cover plate 21 and a screw 26 for securing the plate 21 to the fitting. The pipe section 10 includes an elongated lower section 11, an intermediate section 12 and a top section 13.

Figure 6:
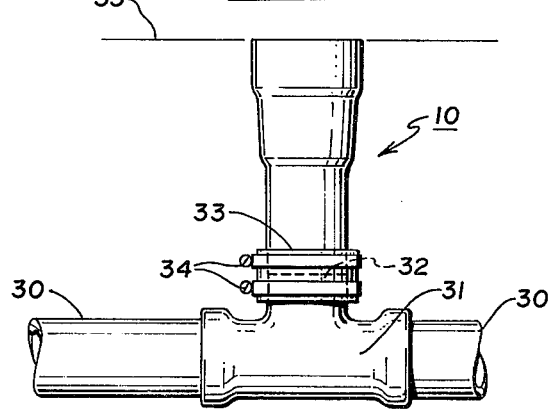
FIG. 6 is a plan view, partially in section, showing one of the ways in which the cleanout fitting of the present invention is connected with a vertical riser.

The lower elongated pipe section 11 is a generally cylindrical portion having a constant internal diameter and being adapted for connection at its lower end to a vertical riser. The cleanout fitting of the present invention is intended for use in the construction industry and as illustrated in FIG. 6, is adapted for use in conjunction with a lateral sewer line 30 and a vertical section or riser 32. The riser 32 can be a vertically extending portion of the tee member 31 as illustrated or as is most often the case, can be a vertical extension of such portion. The cleanout fitting is adapted for connection to the riser 32 so that the top of the fitting 10 is flush with the intended floor level 35. To achieve the desired level, the lower end of the pipe section 11 is cut off with a hacksaw or other similar means and then connected with the riser 32. If the riser 32 consists of a pipe stub as shown in FIG. 2 or the vertical extending portion of the tee 31 as shown in FIG. 6, the two pipe sections are joined by the rubber sleeve 33 and a pair of stainless steel clamps 34 in a conventional manner. If the riser 32 has a bell or hub end, other conventional connecting gaskets or means are available.

While the diametrical dimension of the pipe section 10 can vary, the preferred embodiment contemplates a size sufficient to mate with a riser 32 of conventional size.

The intermediate pipe section 12 is integrally formed with the lower section 11 at the junction 14 and is belled-out relative to the section 11. The section 12 is also a generally cylindrical section, but with a gradually increasing diameter as it extends toward the top of the section. The section 12 includes a plurality of internal, tapered threads 16 for engagement with the external threads 22 of the plug member 18. During construction of the preferred embodiment, the belled-out section 12, with the slightly increasing diameter, is first formed. At this stage, the inner cylindrical wall of the section 12 has a slightly increasing diameter as it extends toward the top. An appropriate tap is then turned into the section 12 to form the internal threads 16. In the preferred embodiment the threads 16 are 4 inch standard pipe thread (4" npt) which are slightly tapered. However, because the slightly sloping inner wall of the section 12 slopes slightly more than the taper of the threads, some of the internal threads 16 have flat outer surfaces 17 as illustrated in FIG. 7. Thus, the diametrical distance between the innermost points of the threads 16 gradually increases as the thread extends toward the top of the section 12. This facilitates insertion of the thread protector 29 as will be described in more detail below.

The upper pipe section 13 is integrally joined with the intermediate section 12 at the junction 15. The section 13 is also a generally cylindrical portion whose diameter is larger than the diameter of the intermediate section 12. The top edge of the section 13 includes a vertically extending flange portion 19 at its outer periphery and a generally horizontally disposed seat or shoulder portion 20 recessed from the top edge of the section 13. The flange 19 and shoulder portion 20 function to secure the upper cap or coverplate 21 to the pipe 10.

A plug member indicated generally by the reference numeral 18 is adapted for threaded connection with the internal threads 16 of the section 12. The plug member 18 includes a plurality of external threads 22 and a means facilitating rotation of the plug in the form of a centrally disposed raised portion 24. As illustrated best in FIGS. 1 and 3, this raised portion 24 is shaped to facilitate manual rotation of the plug member 18 and thus engagement between the external threads 22 and the internal threads 16. In the preferred embodiment, the raised portion 24 has a generally square shape as viewed from the top. This also facilitates engagement with an appropriate tool to assist in the rotation of the plug member 18 and thus the tightening or loosening of the plug member 18 relative to the intermediate section 12. It is contemplated that the means facilitating rotation of the plug 18 could be a recessed portion rather than a raised portion, however, a recessed portion would be more difficult to rotate manually. In the preferred embodiment, the plug is constructed of PVC or other plastic material. It has been found that this is preferable to the brass, steel or cast iron of the prior art that can corrode and join threads during the passage of time. The plug member 18 also includes a centrally disposed internally threaded insert 25 to receive the externally threaded screw 26. In the preferred embodiment, this insert 25 is a threaded brass insert which is secured within a portion of the raised section 24 by external threads on the insert engaging with internal threads on the plug 18. It is contemplated that other conventional connection means can also be utilized.

The plate 21 comprises a generally flat, circular plate having a thickness approximating the length of the flange portion 19 and a diameter approximating the internal diameter of the flange portion 19, thus facilitating the seating of the plate 21 on the shoulder portion 20. When the plate 21 is properly seated, the top surface of the plate is flush with the top edge of the flange portion 19. The plate 21 is retained in the seated position illustrated in FIG. 2 by the threaded screw member 26. The screw 26 extends through the center of the plate 21 and into the threaded insert 25 in the raised portion 24 of the cap 18. In the preferred embodiment, the threaded screw 26 is a flat headed stove bolt with external threads. As shown best in FIG. 1, the plate 21 includes a countersunk portion for the screw 26 so that when the screw 26 is properly engaged, its top surface is flush with the top surface of the plate 21.

The cleanout fitting of the present invention also includes a thread protector 29. As illustrated best in FIGS. 1 and 2, the thread protector 29 comprises a generally hollow cylindrical element. When the plug member 18 is in its operative position within the section 12, the protector 29 is adapted to fit within the space above the plug 18 and below the plate 21 as shown in FIG. 2. When the plate 21 and plug member 18 are removed so that the sewer line can be cleaned, the thread protector 29 is inserted into the section 12 so that it assumes the position illustrated in FIG. 5. In FIG. 5 the thread protector 29 is disposed within the intermediate section 12 in the area of the internal threads 16 to protect the threads 16 from damage caused by the cleaning tools, etc. The thread protector 29 is retained in this position during cleaning and prevented from sliding down into the section 11 by interference between the outer surface of the protector 29 and a portion of the interior surface of the section 12 or a portion of the inner surface of the threads 16. To function in the manner described above, the exterior diametrical dimension of the protector 29 must be less than the interior dimension of the pipe section 13 and less than the innermost diametrical dimension of at least a portion of the internal threads 16. Such external dimension must, however, be greater than the internal dimension of the pipe section 11. With these dimensional relationships, the protector 29 will be allowed to pass at least a portion of the internal threads 16 and be seated within a portion of the intermediate section 12. The interior diametrical dimension of the protector 29 must be large enough to accommodate the raised center portion 24 when the protector 29 is disposed in the position illustrated in FIG. 2. The length of the section 13 must be sufficient to accommodate the protector 29.

Although the description of the preferred embodiment has been quite specific, it is contemplated that various changes and modifications could be made to such embodiment without deviating from the spirit of the invention. Thus, it is intended that the scope of the present invention be dictated by the appended claims rather than by the description of the preferred embodiment.

What is claimed is:

1. A cleanout fitting comprising:
    an elongated pipe being of one piece synthetic plastic construction and being generally cylindrically shaped and hollow throughout its entire length, said pipe having a cylindrical lower pipe section with a generally cylindrical internal surface, the internal diameter of the lower pipe section being substantially uniform throughout, a cylindrical intermediate pipe section with a generally cylindrical internal surface integrally connected with said lower pipe section along the entire top edge of said lower pipe section, the internal diameter of the cylindrical intermediate pipe section being substantially uniform throughout, a cylindrical upper pipe section with a generally cylindrical internal surface integrally connected with said intermediate pipe section along the entire top edge of said intermediate pipe section, the internal diameter of the upper pipe section being substantially uniform throughout, said intermediate pipe section having a plurality of internal threads, the internal cylindrical surfaces of said lower pipe section, said intermediate pipe section and said upper pipe section forming a continuous internal surface which is free of any structure attached to and disposed radially inwardly of the internal cylindrical surfaces of said lower pipe section, said intermediate pipe section and said upper pipe section, said intermediate pipe section being larger in internal diameter than said lower pipe section and said upper pipe section being larger in internal diameter than said intermediate pipe section;
    a plug member having a plurality of external threads engaged with said plurality of internal threads;
    means facilitating the rotation of said plug member;
    a cover plate seated against an upper portion of said pipe section; and
    means for retaining said cover plate relative to said pipe section including connection means for selectively connecting said cover plate to said plug member.

2. The cleanout fitting of claim 1 wherein said pipe is constructed of a lightweight plastic material.

3. The cleanout fitting of claim 2 wherein said pipe is constructed of polyvinylchloride.

4. The cleanout fitting of claim 1 wherein said means facilitating the rotation of said plug member includes a raised portion on the top surface of said plug portion.

5. The cleanout fitting of claim 4 wherein said raised portion is centrally disposed on the top surface of the plug.

6. The cleanout fitting of claim 5 wherein said plug is constructed of a plastic material such as polyvinylchloride.

7. The cleanout fitting of claim 1 wherein an upper portion of said upper pipe section includes a flange portion and shoulder portion for the seating of said cover plate.

8. The cleanout fitting of claim 1 wherein the means for connecting said cover plate to said plug member includes a connecting member connected with said cover plate and threadedly received by a portion of said plug member.

9. The cleanout fitting of claim 8 wherein said plug member includes a threaded insert for threadedly receiving said connecting member.

10. The cleanout fitting of claim 9 wherein said means facilitating the rotation of said plug member includes a raised portion on the top surface of said plug portion.

11. The cleanout fitting of claim 1 including a hollow cylindrical thread protector disposed within the upper section for positioning radially inwardly of a portion of said plurality of internal threads when said plug member is removed.

12. The cleanout fitting of claim 11 wherein the outer cylindrical dimension of said thread protector is greater than the inner cylindrical dimension of said lower pipe section.

13. The cleanout fitting of claim 12 including means for retaining said thread protector in a position radially inwardly of a portion of said plurality of internal threads.

14. The cleanout fitting of claim 13 wherein said thread protector is retained as a result of interference between the outer cylindrical surface of said thread protector and a portion of the inner surface of said intermediate pipe section.

15. The cleanout fitting of claim 14 wherein the outer cylindrical dimension of said thread protector is less than the inner cylindrical dimension of said upper pipe section.

16. The cleanout fitting of claim 15 wherein the length of said thread protector is less than the length of said upper pipe section.

17. The cleanout fitting of claim 1 wherein said lower and intermediate pipe sections are joined by a downwardly and inwardly sloping pipe portion.

* * * * *